United States Patent [19]

Runnberg et al.

[11] Patent Number: 5,588,279

[45] Date of Patent: Dec. 31, 1996

[54] APPARATUS AND METHOD FOR TRANSPORTING A CONTAINER BETWEEN PROCESSING STATIONS OF A PACKAGING MACHINE

[75] Inventors: Bo Runnberg, Dalby, Sweden; Tommy B. G. Ljungström, Buffalo Grove, Ill.

[73] Assignee: Tetra Laval Holdings & Finance S.A., Pully, Switzerland

[21] Appl. No.: 311,963

[22] Filed: Sep. 26, 1994

[51] Int. Cl.⁶ .............................. B65B 3/00; B65B 7/20; B65B 43/46; B65B 55/04

[52] U.S. Cl. .................. 53/426; 53/467; 53/468; 53/484; 53/167; 53/266.1; 53/372.4; 53/375.4; 198/468.2; 198/468.9

[58] Field of Search .................... 53/565, 372.4, 53/372.5, 376.2, 374.5, 167, 564, 426, 467, 468, 476, 484, 266.1, 375.4; 198/468.2, 468.5, 468.9, 468.1, 468.11, 468.01, 619

[56] References Cited

U.S. PATENT DOCUMENTS

| | | | |
|---|---|---|---|
| 3,120,089 | 2/1964 | Monroe et al. | 53/565 |
| 3,280,531 | 10/1966 | Jagenberg | 53/565 X |
| 3,307,325 | 3/1967 | Garrett et al. | 53/565 |
| 3,313,089 | 4/1967 | Rustad et al. | 53/372.5 X |
| 3,380,222 | 4/1968 | Bergmann et al. | |
| 3,417,543 | 12/1968 | Jones, Jr. | 53/372.5 X |
| 3,529,708 | 9/1970 | Dybala | 198/468.01 |
| 3,579,958 | 5/1971 | Hentges | |
| 3,755,986 | 9/1973 | Hudson | 53/372.4 X |
| 3,820,303 | 6/1974 | Martensson et al. | |
| 4,063,983 | 12/1977 | Shiverdecker | 53/374.5 X |
| 4,126,981 | 11/1978 | King | 53/565 |
| 4,566,251 | 1/1986 | Spisak et al. | 53/565 X |
| 4,805,380 | 2/1989 | Mosse | |
| 5,063,726 | 11/1991 | Boisseau | |
| 5,105,932 | 4/1992 | Bryson, III et al. | 198/619 |
| 5,350,568 | 9/1994 | Tuckner et al. | 53/167 X |

*Primary Examiner*—Horace M. Culver
*Attorney, Agent, or Firm*—McAndrews, Held & Malloy, Ltd.; Patrick N. Burkhart

[57] ABSTRACT

An apparatus for use while moving a container from a first processing station to a second processing station of a packaging machine is set forth which includes pincers for temporarily holding the sealing panels of the container in a generally closed condition as the container is moved from the first processing station to the second processing station. In accordance with one embodiment of a packaging machine that includes the apparatus, the first processing station may be a filling station and the second processing station may be a sealing station. In accordance with another embodiment of the apparatus, a corresponding method is also contemplated.

34 Claims, 6 Drawing Sheets

APPARATUS AND METHOD FOR TRANSPORTING A CONTAINER BETWEEN PROCESSING STATIONS OF A PACKAGING MACHINE

TECHNICAL FIELD

The present invention relates to the transportation of a container from one processing station to another processing station of a packaging machine. More specifically, the present invention relates to an apparatus and method for maintaining a container in a temporary closed condition as it is transported between the processing stations of a packaging machine.

BACKGROUND

Paperboard based containers have been known for the better part of the twentieth century. Such paperboard based containers include gable-top, flat-top, and brik-type containers.

The characteristic simplicity of these containers have helped to sustain their popularity as containers for traditional liquid food products such as milk and juice, but in recent years they have also been used for products ranging from ammunition to Epsom salts. Gable-top and brik-type cartons typically start out as carton blanks made of laminated paperboard or similar material having a thermoplastic coating. The carton blanks are provided with a number of creases to facilitate folding and forming the blank into a generally rectangular container.

During decades of development, manufacturers of packaging machines have devised a variety of ways to form, fill and seal these containers. Today, the most prevalent packaging machines for gable-top cartons are adapted to receive the carton blank after it has been side sealed. The process of side sealing opposite vertical edges of the carton blank results in the forming of a polygonal (usually rectangular) sleeve. The sleeve is received on an indexable mandrel wheel, which rotates the sleeve into respective positions where the end of the sleeve extending outwardly from the mandrel is folded and sealed to form the bottom of the carton.

After the carton bottom has been formed, the carton is then removed from the mandrel and transported to a filing station, where the carton is filled with product. Once the carton has been filled, the top of the carton is folded, for example, into the familiar gable top configuration and is sealed, thus completing the packaging process.

One example of a known packaging machine that operates generally in accordance with these principles is described in U.S. Pat. No. 3,789,746 to Martensson et al. Other examples of such known packaging machines are described in U.S. Pat. No. 3,820,303 to Martensson et al., U.S. Pat. No. 4,759,171 to Bruveris et al., and U.S. Pat. No. 4,790,123 to Ljungström et al. These patents are incorporated by reference.

The containers that are to be filled and sealed by the packaging machine are indexed therethrough from one processing station to the next. Although a high indexing speed may contribute to the overall throughput performance of the packaging machine, that speed is limited, among other things, by the "sloshing" that occurs as an unsealed but filled container is transported between the various processing stations. The sloshing of the container contents occurs as a result of the abrupt start and stop motion of the indexing. As a result of the sloshing, the container contents may splash into the sealing regions at the top of the carton and compromise the integrity of a subsequent sealing operation. Additionally, the container contents may splash into the interior of the packaging machine and thus degrade the performance of the machine, for example, by imposing frequent cleaning and maintenance requirements.

Additional transportation difficulties arise when the container contents or the container interior are sensitive to contaminants. This is particularly true of the contents and/or interior of generally aseptic packages. In such instances, the container contents may become contaminated as the unsealed but filled container is indexed from one processing station to the next since the top of the container remains open to the packaging machine environment during the transportation. Similarly, if the container has been rendered generally aseptic prior to filling, maintaining the interior of the unfilled and unsealed container in its aseptic condition during transportation may be difficult.

SUMMARY OF THE INVENTION

An apparatus for use while moving a container from a first processing station to a second processing station of a packaging machine is set forth which assists in overcoming many of the deficiencies of the prior art. The apparatus includes pincers for temporarily holding the sealing panels of the container in a generally closed condition as the container is moved from the first processing station to the second processing station. In accordance with one embodiment of a packaging machine that includes the apparatus, the first processing station may be a filling station and the second processing station may be a top sealing station. In accordance with another embodiment, the first processing station may be a station that assists in rendering the interior of the container generally aseptic.

The pincers may include a first arm at least partially rotatable about a first pivot axis and a second arm that is likewise at least partially rotatable about a second pivot axis. The first and second arms are rotatable toward one another about their respective axes to grip the sealing panels.

Various embodiments or the apparatus may be particularly adapted for various container types. In gable-top and brik-type containers, the sealing panels include a plurality of top fin flaps as the sealing panels that are gripped by the arms. When used with a gable-top container, the first and second arms are of a sufficient length and spaced apart so that each arm is inclined at an angle when the arms grip and close the fin flaps. In this manner, the arms do not crush the container-top but, instead, conform to the exterior inclined panels of the gable top. Brik-type containers do not include the exterior inclined walls present in gable-top containers. The length of the arms and the spacing therebetween may thus be sufficient to allow the arms to extend horizontally when the arms grip and close the fin flaps.

The pincers may be actuated in a variety of ways. In accordance with one actuation apparatus, first and second pincer assemblies are disposed on opposite sides of a container path. Each of the pincer assemblies includes a guide rod and a plurality of pincers that are disposed for co-rotation with the guide rod. The plurality of pincers are also disposed for slidable movement along the length of the guide rod and are moved along that length by a linear actuator. A rotational actuator rotates the guide rods to urge the pincers on opposite sides of the container path toward one another to grip the sealing panels of the containers disposed therebetween as the containers are moved along the container path from the first processing station to the second processing station. The rotational actuator rotates the guide rods to allow the pincers to disengage the containers when the containers are proximate the second processing station.

A method for transporting a container from a first processing station to a second processing station of a packaging machine is also set forth. The method includes the step of temporarily holding the sealing panels of the container in a generally closed condition as the container is moved from the first processing station to the second processing station. The sealing panels of the container may be held in a closed condition by pincers as the container is moved from the first processing station to the second processing station.

Other objects and advantages of the present invention will become apparent upon reference to the accompanying detailed description when taken in conjunction with the following drawings.

DETAILED DESCRIPTION OF THE PREFERRED EMBODIMENTS

Figure 1:
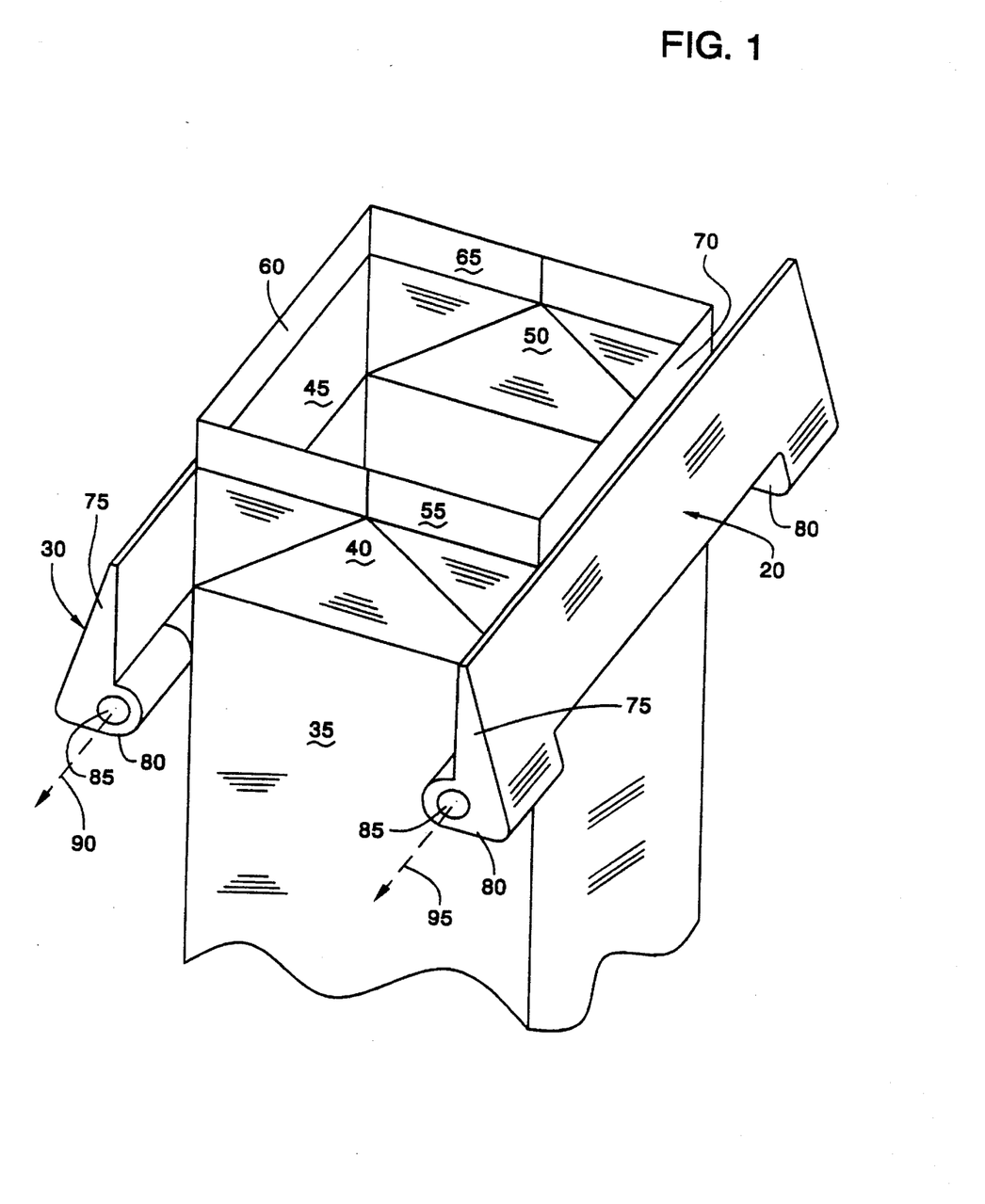
FIG. 1 is a perspective view of an open-top, brik-type container disposed between pincers wherein the pincers are in a retracted state.
Figure 2:
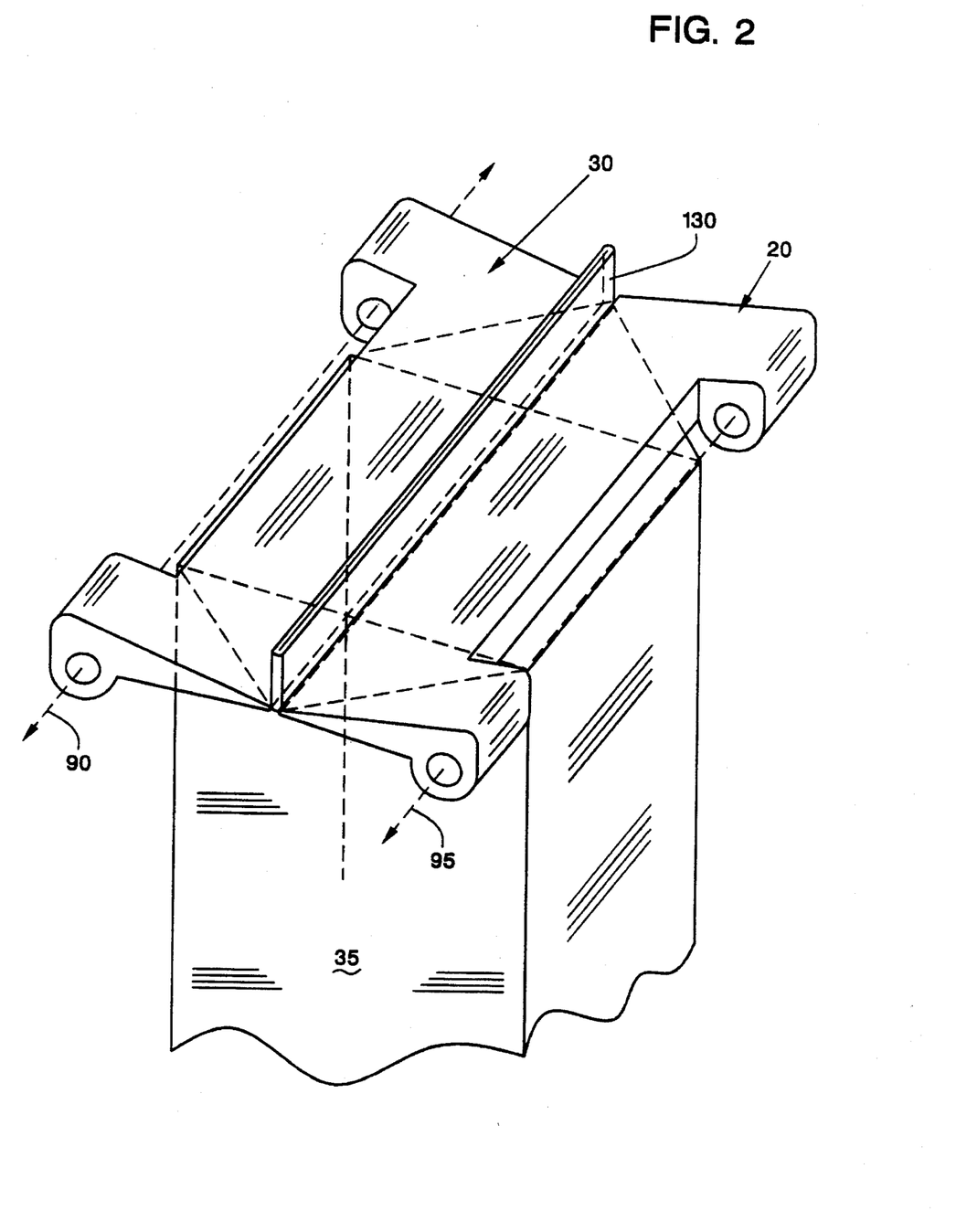
FIG. 2 is a perspective view of the pincers and container illustrated in FIG. 1 wherein the pincers are in a closed state.

The structure and operation of pincers 20 and 30 as applied to a brik-type container 35 are illustrated in FIGS. 1 and 2. The brik-type container 35 includes a top portion having a plurality of score lines that define top flaps 40, 45, and 50 (only three of which are visible on FIG. 1) and fin flaps 55, 60, 65, and 70. The fin flaps 55, 60, 65, and 70 are ultimately sealed by, for example, heat sealing or ultrasonic sealing, during a subsequent top sealing process. The brik-type container may be filled with product or, for example, may be in an empty but generally aseptic condition.

The pincers 20 and 30 each include a generally triangular body portion 75. A connecting tab 80 extend from the base of the triangular body portion 75. The connecting tabs 80 each include a central aperture 85 through which, for example, a rod may be disposed. The aperture and rod associated with each connecting tab 80 may have cooperating knurling to allow the respective pincer and rod to rotate with one another about respective rotation axes 90, 95. Alternatively, the pincers 20 and 30 may rotate freely about the rods, rotation of the pincers being effected through mechanical actuators other than the rods.

Figure 3:
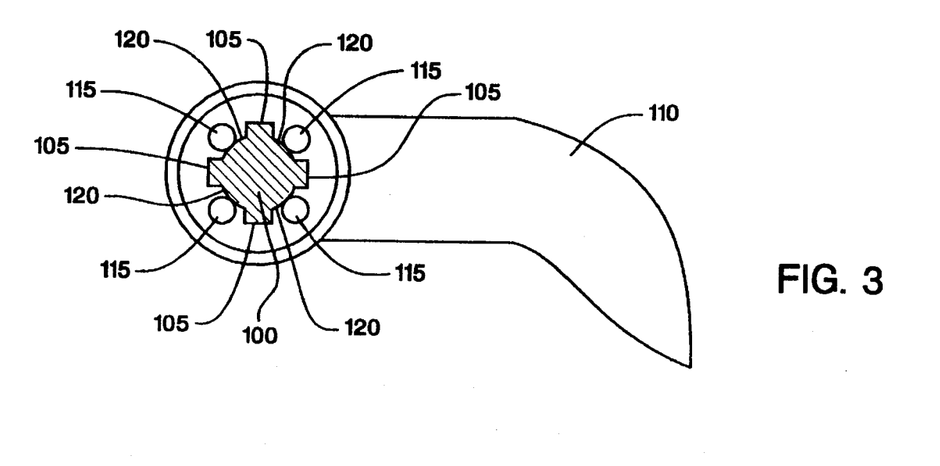
FIG. 3 illustrates one manner of engagement between a pincer and a guide rod.

In accordance with a still further embodiment, the pincers 20 and 30 may engage a rod 100 in the manner illustrated in FIG. 3. In the illustrated embodiment, the rod 100 includes a plurality of tabs 105 extending therefrom. The tabs 105 facilitate co-rotational movement of the rod 100 and pincer 110. A plurality of bearings 115 engage the curved surfaces 120 of the rod 100 to allow linear translation of the pincer 110 along the length of the rod 100. The desirability of this co-rotational and linear movement will be recognized with respect to the overall assembly described below.

As illustrated in FIG. 1, the filled and/or aseptic, open-top, brik-type container 35 is introduced between the pincers 20 and 30 while the pincers are in a retracted state. The pincers 20 and 30 are then rotated toward one another about their respective rotating axes 90 and 95 to the closed position illustrated in FIG. 2. In the closed position, the pincers 20 and 30 grip the base of a fin 130 that is formed by the fin flaps 55, 60, 65, and 70 thereby closing the brik-type container 35 and, if filled, preventing sloshing of the product content into the sealing regions at the interior of the fin flaps. If the container is empty but generally aseptic, the pincers assist in maintaining the hygiene of the container interior. The pincers 20 and 30 are then indexed in this extended position with the brik-type container 35 to a subsequent processing station of the packaging machine. Once the brik-type container 35 has been indexed to the subsequent processing station, the pincers 20 and 30 are retracted and are returned to the prior processing station to repeat the transportation sequence.

Figure 4:
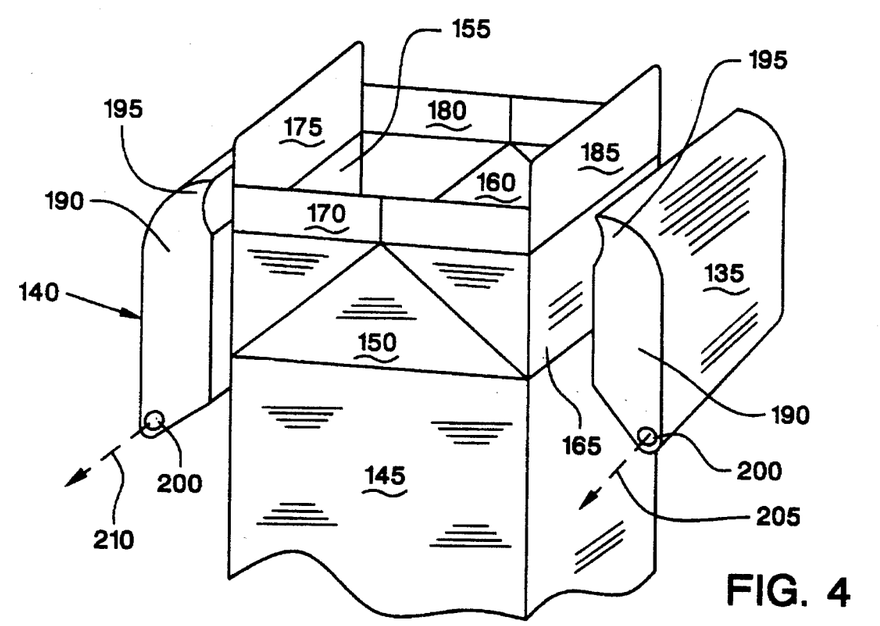
FIG. 4 is a perspective view of an open-top, gable-top container disposed between pincers wherein the pincers are in a retracted state.
Figure 5:
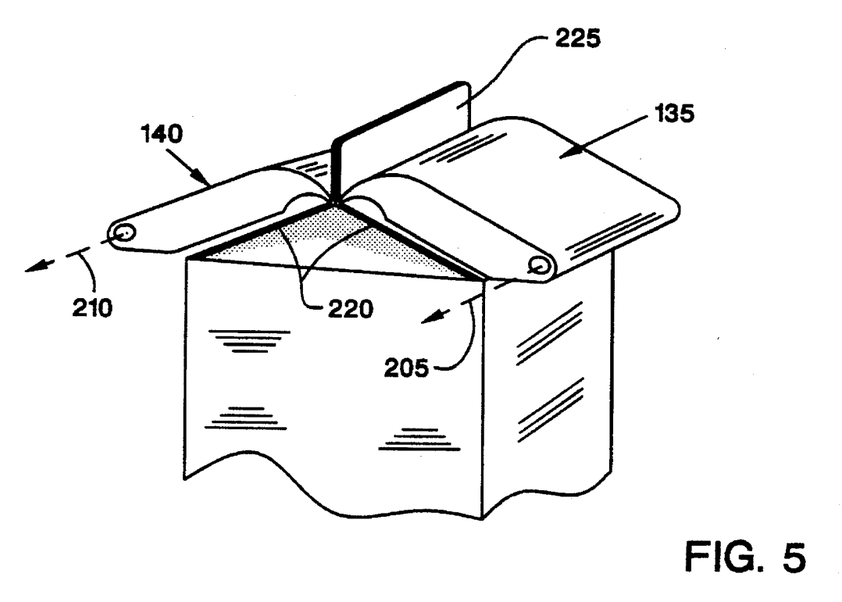
FIG. 5 is a perspective view of the pincers and container illustrated in FIG. 4 wherein the pincers are in a closed state.

The structure and operation of pincers 135 and 140 as applied to a gable-top container 145 are illustrated in FIGS. 4 and 5. The gable-top container 145 includes a top portion having a plurality of score lines that define top flaps 150, 155, 160, and 165, and fin flaps 170, 175, 180, and 185. The fin flaps 170, 175, 180, and 185 are ultimately sealed by, for example, heat sealing or ultrasonic sealing, during a subsequent top sealing process. The gable-top container 145 may be filled with product.

The pincers 135 and 140 each include a body 190. The body 190 terminates in a claw 195 at one end thereof and, further, includes an aperture 200 disposed through the end of the body 190 opposite the claw 195. A rod may extend through each of the apertures 200, each of which may have cooperating knurling to allow the respective placer and rod to rotate with one another about respective rotation axes 205 and 210. Alternatively, the pincers 135 and 140 may rotate freely about the rods, rotation of the pincers being effected through mechanical actuators other than the rods. The pincers 135 and 140 may also engage the rod in the manner shown in FIG. 3.

As illustrated in FIG. 4, the filled and/or generally aseptic, gable-top container 145 is introduced between the pincers 135 and 140 while the pincers are in a retracted state. The pincers 135 and 140 are then rotated toward one another about their respective rotating axes 205 and 210 to the angled position illustrated in FIG. 5. The pincers 135 and 140 are at an angle so as to conform to the exterior inclined panel 220 of the gable-top. In this manner, the pincers 135 and 140 do not deform the gable top structure from its conventional shape. In the angled position, the pincers 135 and 140 grip the base of a fin 225 that is formed by the fin flaps 170, 175, 180, and 185 thereby closing the gable-top container 145 and preventing sloshing of the product contents into the sealing regions at the interior of the fin flaps and/or assisting in maintaining the hygiene of the container interior. The pincers 135 and 140 are then indexed in this angled position with the gable-top container 145 to a subsequent processing station of the packaging machine. Once the gable-top container 145 has been indexed to the subsequent processing station, the pincers 135 and 140 are retracted and are returned to the prior processing station to repeat the transportation sequence.

Figure 6:
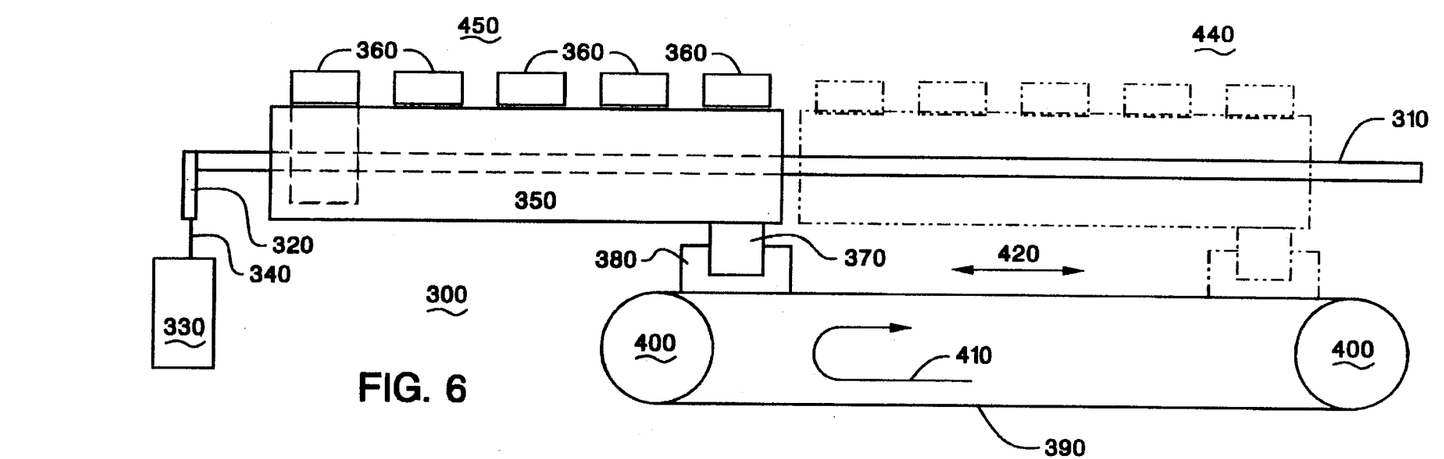
FIGS. 6–10 illustrates some of the various mechanisms that may be used to actuate the pincers illustrated in FIGS. 1 through 5.

FIG. 6 illustrates one embodiment of an apparatus that can be used to actuate the pincers in the manner previously described. The apparatus, shown generally at 300, includes a guide rod 310 having an actuating arm 320 disposed at one end thereof. The actuating arm 320 is connected to an actuator 330, for example, an air cylinder, by a rigid link 340. A pincer carrier 350 is slidably disposed over the guide rod 310. The pincer carrier 350 includes a plurality of pincers 360 that, for example, may be rigidly disposed thereon. The pincers 360 may be adapted for the particular container type, for example, in the manner previously described with respect to gable-top and brik-type containers. A key 370 extends from the bottom of the pincer carrier 350 and engages a corresponding lock member 380. The lock member 380 is disposed on a conveyor belt 390 which may be, for example, driven by rollers 400. The rollers 400, in turn, may be driven by servo motors in a continuous manner such as illustrated by arrow 410, or with a back and forth motion such as illustrated by arrow 410.

Figure 7:
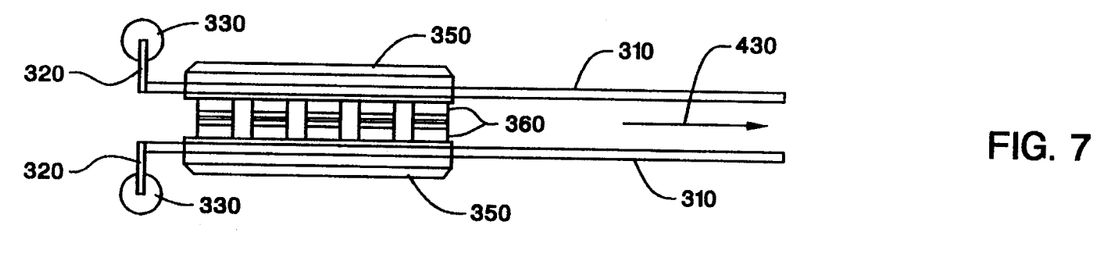
Figure 8:
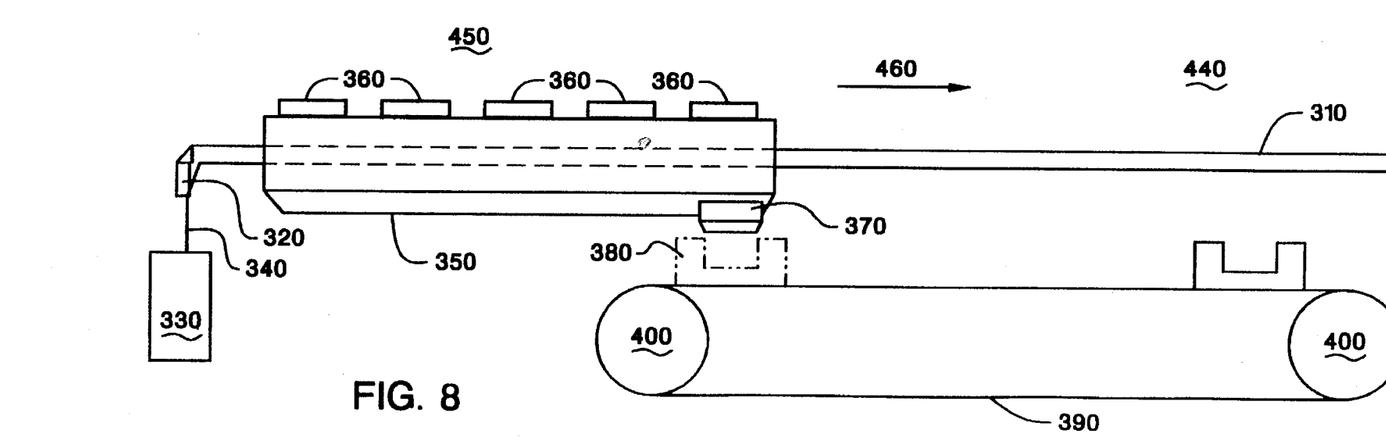

As illustrated in FIG. 7, a guide rod 310, carrier 350, pincers 360, and actuator 330 are disposed on either side of a container indexing path, illustrated by arrow 430, along which the containers proceed from a first processing station to a second processing station. In operation, the carrier 350 and pincers 360 are disposed along the guide rod 310 at, for example, a sealing station 440 with the key 370 and lock 380 engaged. This is illustrated in phantom outline in FIG. 6. The conveyor belt 390 then urges the carrier 350 toward, for example, a filling station 450, via the lock member 370 and key 380 to the position shown in FIG. 8. At this point, the actuator 330 exerts a force on the rigid link 340 to turn the actuation arm 320 to the illustrated position. Rotation of the guide rod 310 results in a corresponding rotation of the pincer carrier 350 and pincers 360 thereby causing the pincers 360 to engage the sealing panels at the tops of any filled containers disposed between them on the container indexing path 430. The rotation of the pincer carrier 350 further causes the key 370 to disengage from the lock member 380. Since the pincers 360 are now engaged with the tops of the containers being indexed along the container indexing path 430, the pincer carrier 350 is allowed to slide along the guide rod 310 in the direction illustrated by arrow 460, thereby maintaining the filled containers in a temporarily sealed condition as they are indexed from the filling station 450 to, for example, the sealing station 440. Once at the sealing station 440, the actuator 330 retracts the rigid link 340 thereby rotating the actuation arm 320 back to the position illustrated in phantom outline in FIG. 6. At this point, the key 370 again engages the lock member 380. Rotation of the guide rod 310 back to this position causes the pincers 360 to disengage the tops of the containers.

It will be recognized that the processing stations 440 and 450 can be any number of processing station types. For example, station 450 may be a station which executes a process that assists in rendering the container generally aseptic. Station 450 in such instance may be, for example, a UV treatment station. Station 440, for example, may be a filling station. In such instances, it will be recognized that the container top will generally open upon disengagement of the pincers due to the natural resilience of the container material. For purposes of the following discussions, the station 450 will be referred to as a filling station while station 440 will be referred to as a sealing station.

Figure 9:
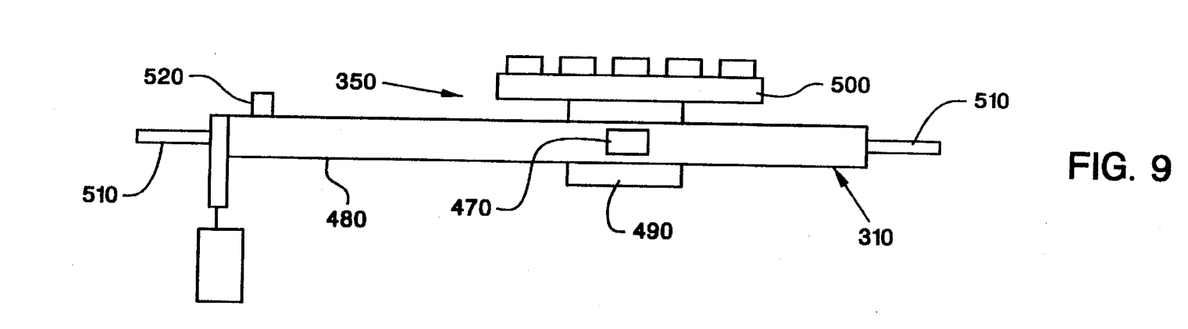

An alternative embodiment that facilitates linear movement of the pincer carrier 350 is illustrated in FIG. 9. In this embodiment, a magnetic core cylinder is used as the rod 310. A magnetic core 470 is disposed in the interior of a cylinder 480 and is magnetically coupled to a magnetic carrier 490 disposed at the exterior of the cylinder 480. A further carrier 500 is attached to the magnetic carrier 490 to form a pincer carrier 350 on which a plurality of pincers 360 are disposed. A compressed gas, such as air, is supplied to the interior of the cylinder 480 through tubing 510 disposed at opposite ends of the cylinder 480. The magnetic core member 470 is moved linearly along the length of the cylinder by the pressure differential of the air supply on either side of the magnetic core member 470. Since the magnetic core member 470 is magnetically coupled to the magnetic carrier 490, the pincers 360 and pincer carrier 350 are likewise moved linearly along the length of the rod.

In operation, for example, the air on either side of the magnetic core member 470 can be pressurized as the pincer carrier 350 is indexed with the containers. On return, one side of the cylinder 480 may be evacuated to effect a rapid return of the carrier 350. Over-travel of the carrier 350 can be limited by, for example, a stop member 520.

Figure 10:
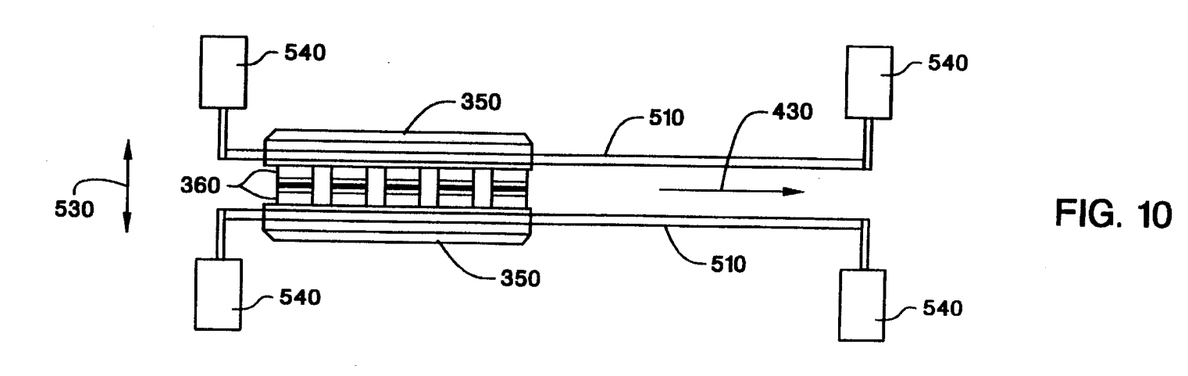

FIG. 10 illustrates an embodiment in which the carriers 350 and their respective pincers 360 are moved linearly toward and away from one another in a direction, illustrated by arrow 530, that is transverse to the container indexing path 430. Such linear motion can be accomplished through the use of, for example, a plurality of actuators 540, such as air cylinders, that are rigidly connected to the rods 510. The pincers 360 of this embodiment may be, for example, formed as flat-faced jaws which, for example, grip the top fin of a gable-top container or may be formed in the previously illustrated manners.

Figure 11A:
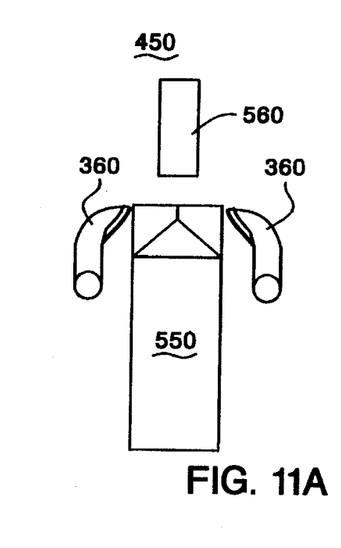
FIGS. 11A–11D illustrate an exemplary sequence of pincer activation as applied to a gable-top container.
Figure 11B:
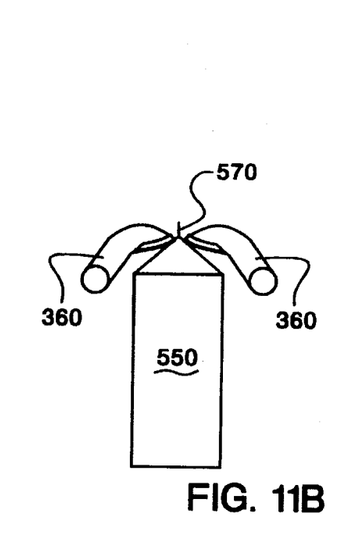
Figure 11C:
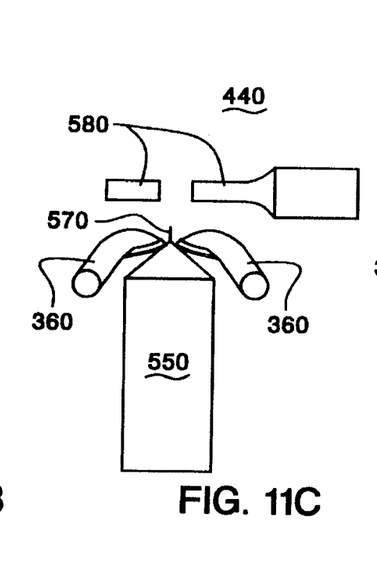
Figure 11D:
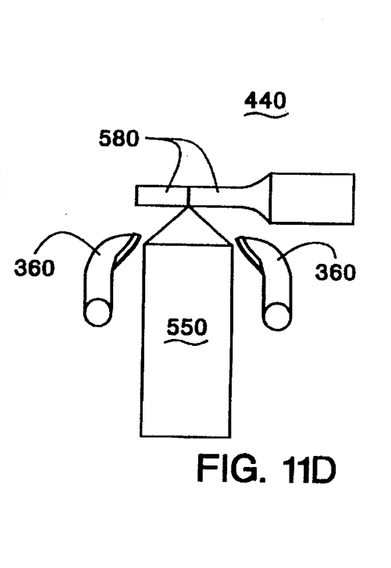

FIGS. 11A–11D illustrate the general relative positions of the pincers 360 and a container 550, in this instance, a gable-top carton, as it is indexed from the filling station 450 to the sealing station 440. The carton 550 is first disposed in an open-top condition between pincers 360 that are in a retracted state and is filled at the filling station 450 through nozzle 560. After filling, the pincers 360 are rotated to engage the top fin 570 of the carton 550 thereby effecting a temporary mechanical seal of the top of the carton 550. The pincers 360 may engage the top in the manner shown in FIG. 11B, or alternatively, in the manner illustrated in FIG. 5. The carton 550 and pincers 360 are then indexed along the container indexing path 430 until it is disposed beneath and between a pair of sealing jaws 580 (FIG. 11C). The pincers 360 are then retracted and the container 550 is urged upward so that the fin 570 is disposed between the sealing jaws 580. The sealing jaws 580 then engage the fin 570 to seal it with, for example, heat or ultrasonic energy. Although the present invention has been described with reference to a specific embodiment, those of skill in the art will recognize that changes may be made thereto without departing from the scope and spirit of the invention as set forth in the appended claims.

We claim as our invention:

1. An apparatus for use while moving a container from a first processing station to a second processing station of a packaging machine, said container including a top portion defined by a plurality of sealing panels, said apparatus comprising:

(a) pincers for temporarily holding said sealing panels of said container in a generally closed condition as said container is moved along a container path having a first end defined by said first processing station and a second end defined by said second processing station, the pincers comprising i. a first arm at least partially rotatable about a first pivot axis extending in the direction of the container path, ii. a second arm at least partially rotatable about a second pivot axis extending in the direction of the container path, said first and second arms being rotatable toward one another to grip and temporarily seal said sealing panels; and (b) means for moving said pincers along with the container along at least a substantial distance of the container path while maintaining the container in the closed condition.

2. An apparatus as claimed in claim 1 wherein said first processing station is a filling station.

3. An apparatus as claimed in claim 2 wherein said second processing station is a carton sealing station.

4. An apparatus as claimed in claim 1 wherein the first processing station is a processing station that assists in rendering the container generally aseptic.

5. An apparatus as claimed in claim 4 wherein the second processing station is a filling station.

6. An apparatus as claimed in claim 1 wherein said container is a gable-top carton and wherein said sealing panels include a plurality of top fin flaps, said pincers dimensioned with respect to one another to grip and close said container at a fin formed from said plurality of top fin flaps when the pincers are rotated to a closing position.

7. An apparatus as claimed in claim 6 wherein said first and second arms are each inclined at an angle when said when said first and second arms grip said fin thereby to conform to exterior inclined panels of said gable-top container.

8. An apparatus as claimed in claim 1 wherein said container is a brik-type container having a plurality of sealing panels, said pincers dimensioned with respect to one another to grip and close said container at an upstanding fin formed by said sealing panels when the pincers are rotated to a closed position.

9. An apparatus as claimed in claim 8 wherein said first and second arms are generally horizontal when said first and second arms grip said sealing panels.

10. A packaging machine for filling and sealing a container, said container having a top portion defined by sealing panels, said packaging machine comprising:

a) a first processing station for executing a first processing step, said first processing step being one of a plurality of processing steps executed by said packaging machine to fill and seal said container;

b) a second processing station for executing a second processing step, said second processing step being one of a plurality of processing steps executed by said packaging machine to fill and seal said container;

c) transport means for transporting said container in a filled condition along a container path between said first and second processing stations;

d) holding means for temporarily holding said sealing panels of said filled container in a generally closed condition as said filled container is transported from said first processing station to said second processing station, said holding means moving along with said filled container at least a substantial distance along the container path while maintaining the container in the closed condition, said holding means comprising i. a first arm at least partially rotatable about a first pivot axis extending in the direction of the container path, ii. a second arm at least partially rotatable about a second pivot axis extending in the direction of the container path, said first and second arms being rotatable toward one another to grip and temporarily seal said sealing panels for the duration in which the container is transported along the substantial distance.

11. A packaging machine as claimed in claim 10 wherein said first processing step includes filling said container at said first processing station.

12. A packaging machine as claimed in claim 11 wherein said second processing step includes sealing said sealing panels to one another to seal said top portion of said filled container at said second processing station.

13. A packaging machine as claimed in claim 11 wherein said holding means comprises first and second jaw members movable toward one another to grip said sealing panels.

14. A packaging machine as claimed in claim 13 wherein said first and second jaw members are movable toward one another in a generally planar manner in a direction transverse to said container path.

15. A packaging machine as claimed in claim 10 wherein said first processing step is a step in rendering said container generally aseptic.

16. A packaging machine as claimed in claim 10 wherein said container is a gable-top carton and wherein said sealing panels include a plurality of top fin flaps said first and second arms being dimensioned with respect to one another to grip and close said container at a fin formed from said plurality of top fin flaps when the first and second arms are rotated to a closed position.

17. A packaging machine as claimed in claim 16 wherein said first and second arms are each inclined at an angle when said when said first and second arms grip said fin thereby to conform to exterior inclined panels of said gable-top container.

18. A packaging machine as claimed in claim 10 wherein said container is a brik-type container having a plurality of sealing panels, said first and second arms being dimensioned with respect to one another to grip and close said container at an upstanding fin formed by said sealing panels when the first and second arms are rotated to a closed position.

19. A packaging machine as claimed in claim 18 wherein said first and second arms are generally horizontal when said first and second arms temporarily hold said sealing panels.

20. A method for filling and sealing a container in a packaging machine, said container including a top portion defined by a plurality of sealing panels, said method comprising the steps of:

a) filling said container at a filling station;

b) transporting said container to a sealing station along a container path;

c) temporarily holding said sealing panels of said container in a generally closed condition with a pair of opposed pincers rotatable about respective generally horizontal axes to grasp and hold the sealing panels in a closed condition as said filled container is transported from said filling station to said sealing station, the pincers being mounted for linear movement with the container to allow the pincers to move with the container along at least a substantial distance between the filling and sealing stations while maintaining the sealing panels of the container in the closed condition; and d) sealing said plurality of sealing panels at said sealing station.

21. A method as claimed in claim 20 wherein said step of temporarily holding said sealing panels of said filled container is further defined by temporarily holding said sealing panels of said filled container in a generally closed condition with a plurality of pincers as said filled container is moved from said filling station to said sealing station.

22. An apparatus for transferring containers from a first processing station to a second processing station of a package filling machine, said containers each including a top portion defined by a plurality of sealing panels, said apparatus comprising:
   a) first and second pincer assemblies disposed on opposite sides of a container path, each of said pincher assemblies comprising
      a guide rod having a length,
      a plurality of pincers disposed for corotation with said guide rod and further disposed for slidable movement along the length of said guide rod;
   b) linear movement means for facilitating movement of said plurality of pincers along the length of said guide rods;
   c) rotational movement means for facilitating rotation of said guide rods to urge pincers on opposite sides of said container path toward one another to grip the plurality of sealing panels of said containers as said containers move along said container path from said first processing station to said second processing station and for facilitating rotation of said guide rods to allow said pincers to disengage said containers when said containers are proximate said second processing station.

23. An apparatus as claimed in claim 22 wherein said first and second pincer assemblies each further comprise a carrier disposed for corotation with said guide rod and disposed for slidable movement along the length of said guide rod, said plurality of pincers being fixed to said carrier.

24. An apparatus as claimed in claim 22 wherein said linear movement means comprises:
   a) a key member disposed on said carrier;
   b) a conveyor assembly having a conveyor belt; and
   c) a lock member disposed on said conveyor belt.

25. An apparatus as claimed in claim 22 wherein said linear movement means comprises:
   a) a magnetic core cylinder as said guide rod, said magnetic core cylinder connected to receive a compressed gas;
   b) a magnetic core member disposed in said magnetic core cylinder and movable by said compressed gas; and
   c) means for magnetically coupling said pincer carrier with said magnetic core member.

26. An apparatus for transferring containers from a first processing station to a second processing station of a package filling machine, said containers each including a top portion defined by a plurality of sealing panels, said apparatus comprising:
   a) first and second pincer assemblies disposed on opposite sides of a container path, each of said pincer assemblies comprising
      a guide rod having a length,
      a plurality of pincers disposed for linear movement along the length of said guide rod;
   b) first linear movement means for facilitating movement of said plurality of pincers along the length of said guide rods;
   c) second linear movement means for moving said guide rods in a direction transverse to said container path to urge pincers on opposite sides of said container path toward one another to grip the plurality of sealing panels of said containers as said containers move along said container path from said first processing station to said second processing station, and for separating said guide rods to allow said pincers to disengage said containers proximate said second processing station.

27. An apparatus as claimed in claim 26 wherein said first and second pincer assemblies each further comprise a carrier disposed for slidable movement along the length of said guide rod, said plurality of pincers being fixed to said carrier.

28. An apparatus as claimed in claim 27 wherein said first linear movement means comprises:
   a) a key member disposed on said carrier;
   b) a conveyor assembly having a conveyor belt; and
   c) a lock member disposed on said conveyor belt.

29. An apparatus as claimed in claim 26 wherein said first linear movement means comprises:
   a) a magnetic core cylinder as said guide rod, said magnetic core cylinder connected to receive a compressed gas;
   b) a magnetic core member disposed in said magnetic core cylinder and movable by said compressed gas; and
   c) means for magnetically coupling said pincer carrier with said magnetic core member.

30. An apparatus as claimed in claim 26 wherein said second linear movement means comprises a plurality of compressed gas cylinders.

31. A method for filling and sealing a container in a packaging machine, said container including a top portion defined by a plurality of sealing panels, said method comprising the steps of:
   a) filling said container at a filling station of the packaging machine;
   b) grasping the plurality of sealing panels at the filling station between a pair of opposed closing members to thereby temporarily seal the container;
   c) moving the container and opposed closing members along a container path to a sealing station of the packaging machine while maintaining the container in a temporarily sealed state;
   d) releasing the plurality of sealing panels at the sealing station of the packaging machine from between the pair of opposed sealing members thereby placing the plurality of sealing panels in an unsealed state;
   e) sealing said plurality of sealing panels at said sealing station.

32. A method as claimed in claim 31 wherein steps (b), (c), and (d) utilize a pair of opposed sealing members comprising:
   a first arm at least partially rotatable about a first pivot axis extending in the direction of the container path; and
   a second arm at least partially rotatable about a second pivot axis extending in the direction of the container path, said first and second arms being rotatable toward one another to grip and temporarily seal said sealing panels.

33. A method for sterilizing and subsequently filling a container in a packaging machine, said container including a top portion defined by a plurality of sealing panels, said method comprising the steps of:
   a) sterilizing said container at a sterilization station of the packaging machine;
   b) grasping the plurality of sealing panels at the sterilization station between a pair of opposed closing members to thereby temporarily seal the container;
   c) moving the container and opposed closing members along a container path to a filling station of the packaging machine while maintaining the container in a temporarily sealed state;

d) releasing the plurality of sealing panels at the filling station of the packaging machine from between the pair of opposed sealing members thereby placing the plurality of sealing panels in an unsealed state; and e) filling the container at the filling station.

34. A method as claimed in claim 33 wherein steps (b), (c), and (d) utilize a pair of opposed sealing members comprising:

a first arm at least partially rotatable about a first pivot axis extending in the direction of the container path; and a second arm at least partially rotatable about a second pivot axis extending in the direction of the container path, said first and second arms being rotatable toward one another to grip and temporarily seal said sealing panels.

* * * * *